US008836482B2

(12) United States Patent
Park et al.

(10) Patent No.: US 8,836,482 B2
(45) Date of Patent: Sep. 16, 2014

(54) METHOD AND APPARATUS FOR CONTROLLING REMOTE USER INTERFACE CLIENT THROUGH THE THIRD REMOTE USER INTERFACE CLIENT

(75) Inventors: Ho-Yeon Park, Seoul (KR); Sung-Oh Hwang, Yongin-si (KR); Bo-Sun Jung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 397 days.

(21) Appl. No.: 13/393,735

(22) PCT Filed: Sep. 1, 2010

(86) PCT No.: PCT/KR2010/005916
§ 371 (c)(1),
(2), (4) Date: Mar. 1, 2012

(87) PCT Pub. No.: WO2011/028015
PCT Pub. Date: Mar. 10, 2011

(65) Prior Publication Data
US 2012/0159344 A1     Jun. 21, 2012

(30) Foreign Application Priority Data

Sep. 1, 2009   (KR) .................. 10-2009-0082236
Aug. 31, 2010  (KR) .................. 10-2010-0084747

(51) Int. Cl.
*G05B 11/01*    (2006.01)
*H04L 12/28*    (2006.01)
*H04L 29/08*    (2006.01)

(52) U.S. Cl.
CPC .......... *H04L 67/025* (2013.01); *H04L 12/2818* (2013.01)
USPC ........... 340/12.22; 348/734; 715/740; 725/37

(58) Field of Classification Search
CPC .......... H04N 5/44543; H04N 7/17318; H04N 21/4532; H04N 21/4622; H04N 21/482; H04N 21/4227

USPC ........... 340/12.22–12.29, 12.5, 12.51–12.54; 348/734; 725/37–61; 715/740
See application file for complete search history.

(56) References Cited

U.S. PATENT DOCUMENTS

2001/0019367 A1*   9/2001   Walton et al. .................. 348/734
(Continued)

FOREIGN PATENT DOCUMENTS

CN     1692673       11/2005
WO     WO 96/12363   4/1996
(Continued)

OTHER PUBLICATIONS

PCT/ISA/237 Written Opinion issued on PCT/KR2010/005916 (pp. 4).
PCT/ISA/210 Search Report issued on PCT/KR2010/005916 (pp. 4).

*Primary Examiner* — Brian Zimmerman
*Assistant Examiner* — Laura Nguyen
(74) *Attorney, Agent, or Firm* — The Farrell Law Firm, P.C.

(57) ABSTRACT

A method and apparatus are provided for controlling a Remote User Interface Client (RUIC), on which a remote user interface is displayed, through another RUIC. A message including control information that indicates a control action corresponding to a user input at the other RUIC is received at the RUIC from the other RUIC. The RUIC determines whether the control information is predefined information or undefined information. When the control information is predefined information, the control information is delivered from a web server of the RUIC to an application of the RUIC, and a control operation corresponding to the control information is executed by the application. When the control information is undefined information, the received control information is delivered from the web server to the application through a remote control plug-in in the RUIC to execute the control operation corresponding to the control information by the application.

16 Claims, 6 Drawing Sheets

(56) References Cited

U.S. PATENT DOCUMENTS

| | | |
|---|---|---|
| 2005/0172228 A1 | 8/2005 | Kakuda |
| 2006/0112171 A1* | 5/2006 | Rader .......................... 709/218 |
| 2006/0288370 A1* | 12/2006 | Rothschild .................... 725/51 |
| 2007/0157287 A1 | 7/2007 | Lim |
| 2008/0056500 A1 | 3/2008 | Bradley et al. |
| 2009/0156251 A1 | 6/2009 | Cannistraro et al. |

FOREIGN PATENT DOCUMENTS

| | | |
|---|---|---|
| WO | WO 01/20572 | 3/2001 |
| WO | WO 01/71691 | 9/2001 |

* cited by examiner

Fig. 10

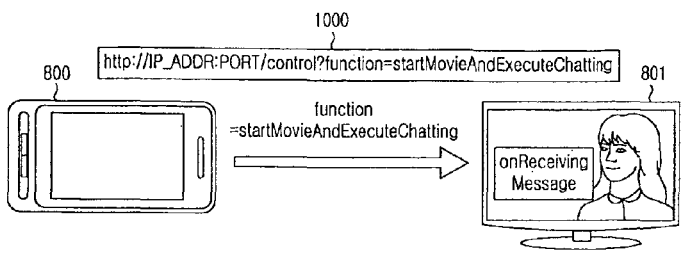

Fig. 11

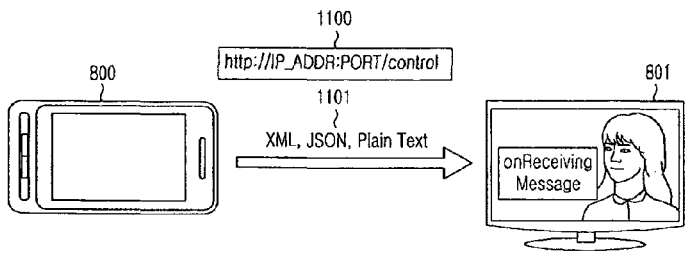

Fig. 12

```
<control>
    <function>startMovieAndExecuteChatting</function>
</control>
```

Fig. 13

| function onReceivingMsg (Integer remoteDeviceHandle, String message ) |
|---|
| The function that is called when the OITF gets the message from the Remote Device. This function handles the message which type is a text (e.g. XML, JSON or Plain Text etc). On the other hand, DAE defined key codes (e.g. "VK_PLAY", "VK_PAUSE" or "VK_STOP" etc) are handled by pre-existing key event handlers (e.g. onKeyDown, onKeyUp etc), not by the application/oipfRemoteControlFunction object.<br><br>The specified function is called with two arguments remoteDeviceHandle and message, which are defined as follows:<br><br>- Integer remoteDeviceHandle - the handle of a Remote Device which is sending the message transferred by the second parameter.<br><br>- String message - the message whose type is a text (e.g. XML, JSON or Plain Text etc). |

Fig. 14

Step 1: The Control UI SHALL send a HTTP message (GET for Step 1-1 / POST for Step 1-2) request to the OITF in each cases.
Step 1-1: The following URI SHALL be used when the Control UI sends the pre-defined key code (ex. VK_PLAY, VK_STOP etc) to the OITF with the effect of key event.
The content of the HTTP Request SHALL be as follows:
- HTTP Request Header: It includes the following:
    - <a request (first) line of HTTP header> – The request URI SHALL be same as the following:
        o GET /rcf/send_keycode?keyevent=<value1>&keycode=<value2> HTTP/1.1
        o A keyevent=<key event type>: indicates a key event which the DAE application will occur to the target object. The key event type SHALL be one of them described as follows:
            · KEY_DOWN
            · KEY_UP
            · KEY_PRESS
        o A keycode=<key code value>: indicates a DAE defined key code (ex. VK_PLAY, VK_STOP etc)
    - <other lines of HTTP headers> – as per RFC 2616 [HTTP]
  HTTP Request Body:Empty Step 1-2: The following URI SHALL be used when the Control UI sends the text type message (ex. XML, JSON, URI or Plain Text etc) to the OITF. This message is going to be handled by DAE application. The content of the HTTP Request SHALL be as follows:
- HTTP Request Header: It includes the following:
    - <a request (first) line of HTTP header> – The request URI SHALL be same as the following:
        o POST /rcf/send_message HTTP/1.1
    - <other lines of HTTP headers> – as per RFC 2616 [HTTP]
  HTTP Request Body: The request body includes an appropriate message generated by the Control UI
Step 2: The Control UI SHALL wait until it receives the HTTP Respond message from the OITF.
Step 3: The OITF returns a 200 OK response.
- HTTP Response Header: It includes the following:
    - <list of HTTP headers> – as per RFC 2616 [HTTP]
- HTTP Response Body: <Appropriate Message Body if applicable>

METHOD AND APPARATUS FOR CONTROLLING REMOTE USER INTERFACE CLIENT THROUGH THE THIRD REMOTE USER INTERFACE CLIENT

PRIORITY

This application is a National Phase Entry of PCT International Application No. PCT/KR2010/005916, which was filed on Sep. 1, 2010, and claims priority to a Korean Patent Application filed in the Korean Intellectual Property Office on Sep. 1, 2009 and assigned Serial No. 10-2009-0082236, and a Korean Patent Application filed in the Korean Intellectual Property Office on Aug. 31, 2010 and assigned Serial No. 10-2010-0084747, the entire disclosures of which are incorporated herein by reference.

BACKGROUND OF THE INVENTION

1. Field of the Invention

The present invention relates generally to a method and apparatus for controlling a remote User Interface (UI) screen represented on a remote UI device, and more particularly, to a method and apparatus for transmitting undefined control information while maintaining the predefined control information in controlling the remote UE screen.

2. Description of the Related Art

Studies to improve home network technologies have been conducted by many industry standards organizations, such as, Digital Living Network Alliance (DLNA), Home Audio-Video Interoperability (HAVi), and Universal Plug and Play (UPnP).

In home networks, Remote User Interface (RUI) technology may be used to allow one device to control the functions of other devices. Briefly, the RUI technology, which is based on a client-server architecture, enables an RUI client to fetch a UI(s) from an RUI server so that a user may control the RUI server through the UI that is on the RUI client.

In this RUI technology, in order for the third RUI device, which is capable of remotely controlling a remote UI device, to control the remote UI device or a remote UI screen represented in the remote UI device, a protocol and method for transmitting control information is required.

SUMMARY OF THE INVENTION

The present invention has been made to address at least the above problems and/or disadvantages and to provide at least the advantages described below. Accordingly, an aspect of the present invention is to provide a method and apparatus for allowing a control UI represented in the third device, which is capable of remotely controlling a remote UI device, to transmit and process predefined control information and undefined control information on the remote UI device or a remote UI screen represented in the remote UI device.

In accordance with one aspect of the present invention, a method is provided for controlling a Remote User Interface Client (RUIC), on which a remote user interface is displayed, through another RUIC. A message including control information that indicates a control action corresponding to a user input at the other RUIC is received at the RUIC from the other RUIC. The RUIC determines whether the control information is predefined information or undefined information. When the control information is predefined information, the control information is delivered from a web server of the RUIC to an application of the RUIC, and a control operation corresponding to the control information is executed by the application. When the control information is undefined information, the received control information is delivered from the web server to the application through a remote control plug-in in the RUIC to execute the control operation corresponding to the control information by the application.

In accordance with another aspect of the present invention, an RUIC is provided, on which a remote user interface is displayed, that is controlled by a user on another RUIC. The RUIC includes a web server for receiving, from the other RUIC, a message including control information that indicates a control action corresponding to a user input at the other RUIC, determining whether the control information is predefined information or undefined information, and transmitting the control information based on the determination. The RUIC also includes an application for receiving the control information from the web server when the control information is predefined information, and for executing a control operation corresponding to the control information. The RUIC further includes a remote control plug-in for, when the control information is undefined information, receiving the control information from the web server, generating a specific event corresponding to the control information, and transmitting the control information to the application.

BRIEF DESCRIPTION OF THE DRAWINGS

The above and other aspects, features and advantages of the present invention will be more apparent from the following detailed description when taken in conjunction with the accompanying drawings, in which:

FIG. 10 is a diagram illustrating the delivery of undefined control information between a third device and an RUIC through an HTTP, according to an embodiment of the present invention;

FIG. 11 is a diagram illustrating an HTTP representing a method for sending undefined messages between a third device and an RUIC, according to an embodiment of the present invention;

FIG. 12 shows an eXtensible Markup Language (XML) format that can be included in an HTTP BODY when the HTTP of FIG. 11 is used, according to an embodiment of the present invention;

FIG. 13 shows an Application Programming Interface (API), according to an embodiment of the present invention;

FIG. 14 shows an interface and transmission step for transmitting a predefined or undefined command or message to an OITF terminal by a third device using a predefined key code value, according to an embodiment of the present invention.

DETAILED DESCRIPTION OF EMBODIMENTS OF THE PRESENT INVENTION

Figure 1:
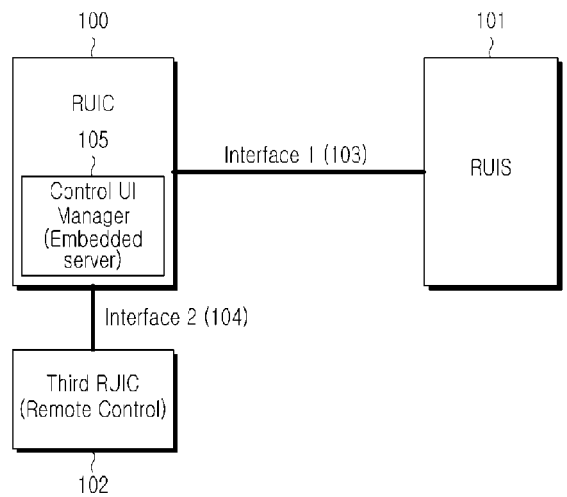
FIG. 1 is a diagram illustrating a general architecture for controlling an RUIC through a third RUIC.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In embodiments of the present invention, an RUIC refers to a device that transmits an RUI and control information to a client in a client-server architecture system. An RUIC receives, from an RUIS, a UI represented in the RUIC and one or more control UIs capable of controlling the UI represented in the RUIC. The RUIC and/or an RUI rendered in the RUIC are controlled by the control UI. The third device, which is an RUIC device, controls an RUIC using an UI, and may receive the UI from the RUIC or the RUIS. The third device may be a mobile device, such as, for example, a mobile phone, or a portable device, such as, for example, a small display device with a communication function. In the following description, the term 'RUIC device' may be construed to refer to the third device.

FIG. 1 is a diagram illustrating a general architecture for controlling an RUIC through the third device.

Referring to FIG. 1, an RUIC 100 receives an RUI and control information from an RUIS 101 through an interface #1 103, which is now in use. As stated herein, the control information may include not only the control information capable of controlling an RUI represented in an RUIC, but also a UI. In the RUIC 100, the received control information is separated by a control UI manager 105, and a control UI is delivered to the third device 102 for controlling the RUIC 100, through the control UI manager 105. The control UI delivered through the control UI manager 105 is represented (or rendered) on the third device 102, and a user may control the RUIC 100 using the control UI delivered through the control UI manager 105. The control UI manager 105, which is a logical entity, may exist inside or outside the RUIC 100.

Figure 2:
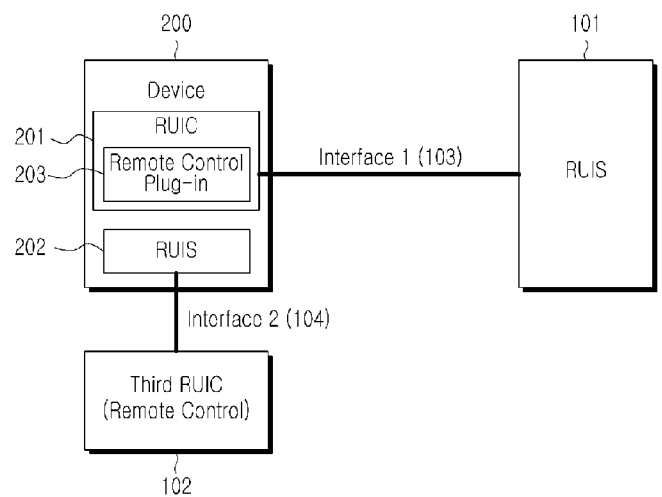
FIG. 2 is a diagram illustrating an architecture having a device that includes a Remote User Interface Server (RUIS) and an RUIC.
Figure 3:
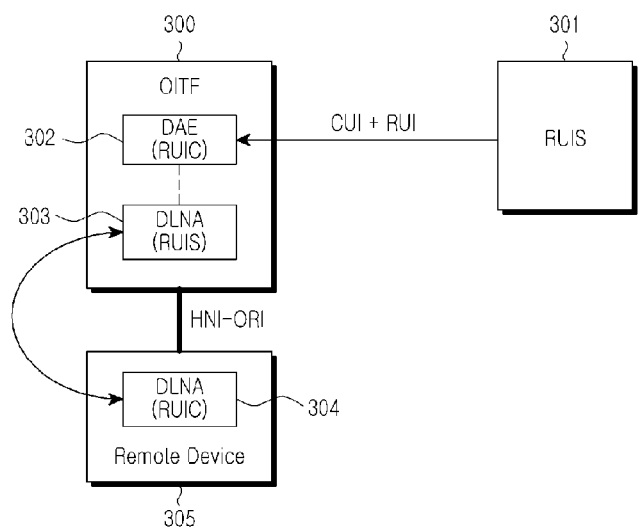
FIG. 3 is a diagram illustrating an architecture having an Open Internet Protocol TeleVision (IPTV) Terminal Function (OITF)

FIGS. 2 and 3 show different architectures in which a control UI manager exists inside and outside an RUIC.

Referring to FIG. 2, the RUIC 100 shown in FIG. 1 is represented as a device 200 that includes an RUIS 202 and an RUIC 201, and the RUIC 201 has a Remote Control (RC) plug-in 203.

Referring to FIG. 3, the RUIC 100 shown in FIG. 1 is represented as an OITF 300 that includes a Declarative Application Environment (DAE) entity 302, which serves as an RUIC, and a Digital Living Network Alliance (DLNA) RUIS entity 303. The third device 102 of FIG. 1 is represented as a remote device 305, which includes a DLNA RUIC entity 304.

As illustrated in FIGS. 2 and 3, the control UI manager may be the DLNA RUIS 303 or the RUIS 202 of Consumer Electronics Association (CEA)-2014, and an embedded server functional entity (not shown) existing in the OITF 300, for communication with mobile/portable devices. In addition, the control UI manager may function as the remote control plug-in 203 in the RUIC 201. Also, the control UI manager may control an RUIC or an RUI being represented in the RUIC by means of a control UI represented in the third device 102 through an interface #2 104 between the RUIC 100 and the third device 102 of FIG. 1, using UPnP or HTTP.

Figure 4:
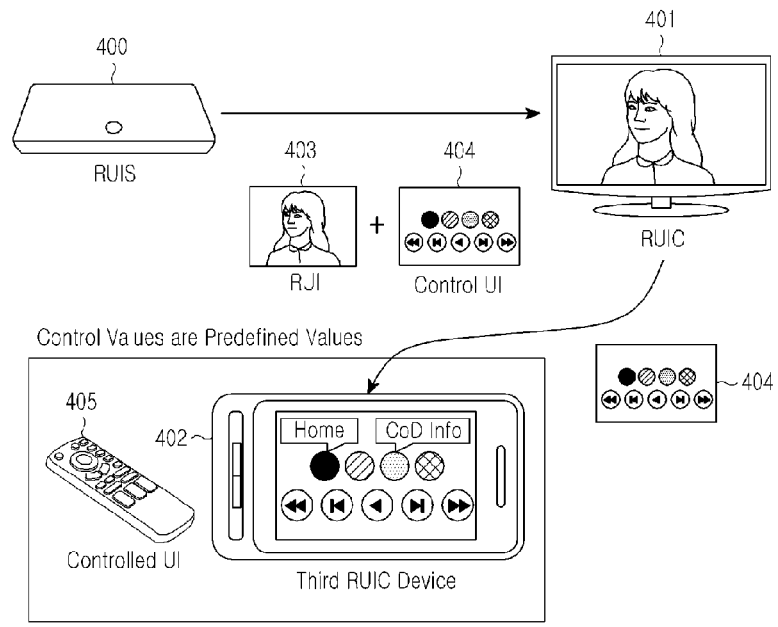
FIG. 4 is a diagram illustrating control of an RUIC through a control UI in a third device or a remote controller.

FIG. 4 is a diagram illustrating control of an RUIC through a control UI in the third device or a remote controller.

Upon receiving an RUI 403 and a control UI 404 from an RUIS 400, an RUIC 401 represents the RUI 403 on its screen and transmits the control UI 404 to the third device 402. The third device 402 represents the received control UI 404 on its screen, and a user controls the RUIC 401 or the RUI 403 being represented in the RUIC 401 through the control UI 404 being represented on the screen of the third device 402. In addition, the user transmits predefined control information to the RUIC 401 using a conventional remote controller 405.

In this scheme, when transmitting control information to the RUIC 401, the third device 402 or the remote controller 405, generally sends control information predefined between the two devices 402 and 401 (or 405 and 401). For example, when a STOP command is issued for the RUI 403 being represented in the RUIC 401, a single command STOP is transmitted from the third device 402 to the RUIC 401. However, in this scheme, it is impossible to perform complex functions of stopping the RUI 403 presently being represented in the RUIC 401, representing on a screen a list of dramas having a high correlation with the RUI 403, shifting the focus to the item most preferred by the user in the list, and delivering information about the item to the control UI 404 in the third device 402.

Furthermore, with the addition of a new 'personalized channel' function, even in the case where the user intends to transmit fragmentary control information instructing to change the screen to a personalized channel, because a key associated with the function is not predefined, the user should map the function to a predefined button, or should move to a 'personalized channel' button represented on the screen of the RUIC 401 using a navigation key to select the function. In particular, in the former case where the function is mapped to a predefined button, such mapping information should be predetermined between the RUIC 401 and the third device 402. In this case, however, the RUIC 401 may not be compatible, when operating in conjunction with other RUICs or other third devices. In addition, in the latter case where the navigation key is used, the user is required to press/click a number of buttons to select the personalized channel function. Embodiments of the present invention provide a method and an apparatus for transmitting control information undefined in another RUIC and delivering the undefined control information to the other RUIC or an RUI represented on the other RUIC, so that the control information may actually control a control target.

Figure 5:
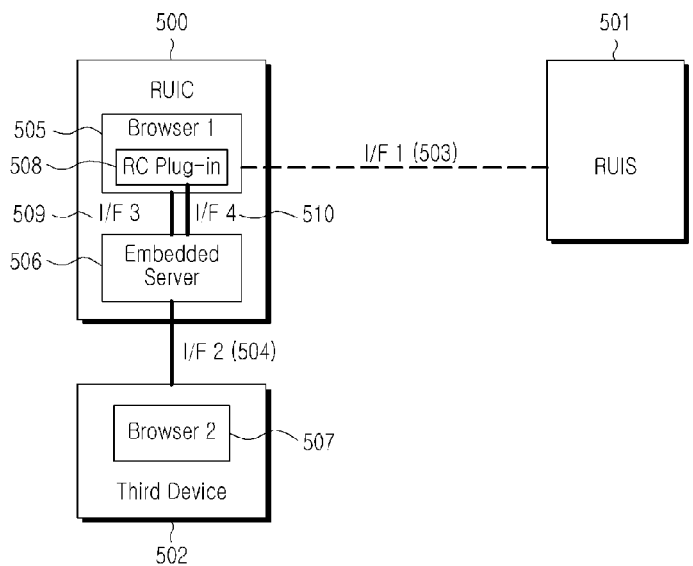
FIG. 5 is a diagram illustrating an interface between an RUIC and a third device for controlling the RUI, according to an embodiment of the present invention.

FIG. 5 is a diagram illustrating an interface between an RUI represented in an RUIC and a control UI represented in the third device for controlling the RUI, according to an embodiment of the present invention.

Referring to FIG. 5, if an RUI provided from an RUIS 501 is transmitted to an RUIC 500, the RUI is represented in a browser #1 505 of the RUIC 500. The RUIC 500 receives from the RUIS 501 a control UI capable of controlling the RUI represented in the browser #1 505, and transmits the received control UI to the third device 502 through an embedded server 506. The third device 502 represents the control UI on a browser #2 507 so that the user may use it.

In FIG. 5, bold lines indicate paths through which control information is delivered, which includes the control UI and the RUI represented in the browser #1 505. For an interface #2 504 between the browser #2 507 and the embedded server 506, protocol information about all predefined or undefined control information is defined. In addition, an interface #3 509 between the embedded server 506 and the browser #1 505 indicates an interface that transmits exiting control information when the control information transmitted from the third device 502 is the same as the existing control information. An interface #4 510 between the embedded server 506 and an RC plug-in 508 indicates an interface for transmitting undefined control information.

Figure 6:
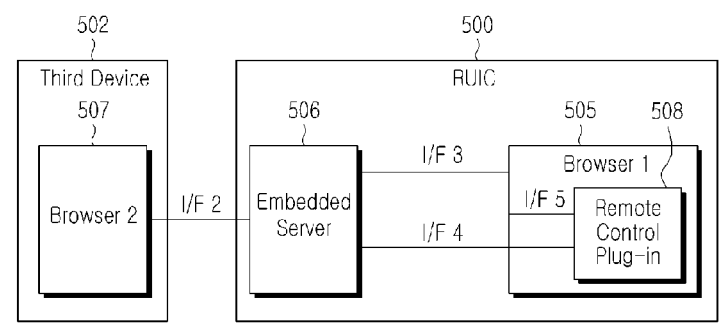
FIG. 6 is a diagram illustrating structures and interfaces of a third device and an RUIC, according to an embodiment of the present invention.

FIG. 6 shows structures and interfaces of the third device and the RUIC, according to an embodiment of the present invention.

Referring to FIG. 6, interfaces #2, #3 and #4 are the same as those illustrated in FIG. 5, and an interface #5 indicates an interface capable of delivering the control information, which is delivered to the RC plug-in 508, to the RUI running in the browser #1 505.

Figure 7:
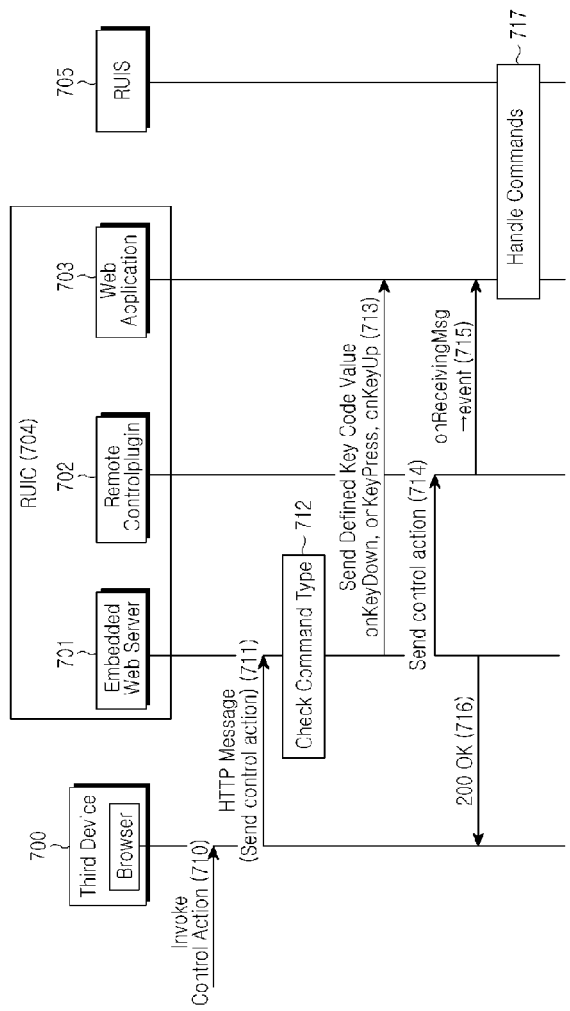
FIG. 7 is a diagram illustrating the sending of predefined control information and undefined control information, according to an embodiment of the present invention.

FIG. 7 illustrates the sending of predefined control information and undefined control information, according to an embodiment of the present invention.

Figure 8:
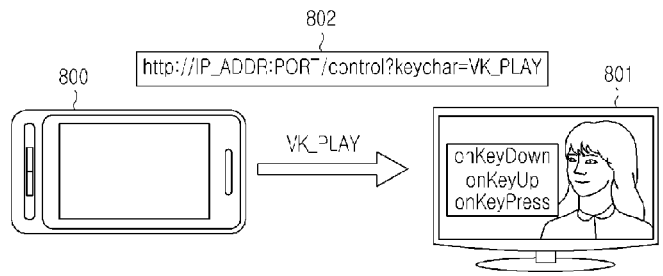
FIG. 8 is a diagram illustrating the delivery of predefined control information between a third device and an RUIC through a HyperText Transfer Protocol (HTTP)
Figure 9:
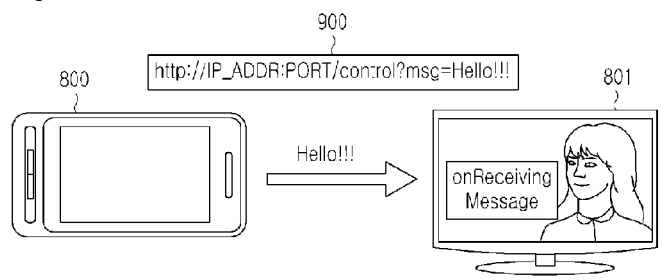
FIG. 9 is a diagram illustrating the delivery of undefined control information between a third device and an RUIC through an HTTP, according to an embodiment of the present invention.

If a user invokes a control action through a third device 700 in step 710, associated control information is transmitted to an embedded web server 701 of an RUIC 704 in the form of an HTTP message, in step 711. The embedded web server 701 includes a control handler application capable of handling an HTTP message transmitted from the third device 700. The control information is represented in the form of a Uniform Resource Identifier (URI) existing in a 'form' tag or an 'a' tag in a Hypertext Markup Language (HTML) message in a control UI rendered in the third device 700. Such URI forms may be represented as shown in FIGS. 8 to 10.

Regarding the transmitted control information, the control handler application in the embedded web server 701 determines whether the control information is predefined control information, in step 712. More specifically, upon receiving an HTTP Request message from the third device 700, the embedded web server 701 determines whether a predefined parameter's key value (e.g., a keychar) is included in the HTTP message. If the key value of a predefined parameter is included in the HTTP message, the control handler application in the embedded web server 701 extracts a 'Value' corresponding to the key value, generates a predefined event, inserts the extracted 'Value' value in a parameter of the event, and delivers it to an application 703, in step 713. Based on the 'Value' delivered through the parameter along with the event, an operation corresponding to the key is performed in the application 703 through a javascript function.

If the parameter key value delivered to the embedded web server 701 is not a predefined parameter key values, the control handler application in the embedded web server 701 extracts a 'Value' corresponding to a relevant parameter key value, and transmits control information with the extracted 'Value' to an RC plug-in 702, in step 714. The 'Value' may be delivered from the embedded web server 701 to the RC plug-in 702 in various different ways, such as, for example, through internal socket communication.

Upon receiving the extracted 'Value', the RC plug-in 702 delivers the extracted 'Value' to the application 703 presently connected to the RC plug-in 702 in the form of a Document Object Model (DOM) event, such as on ReceivingMsg, in step 715.

If the HTTP Request message is delivered from the third device 700 into the embedded web server 701 using the POST method, with an HTTP Request Body including XML and Java Script Object Notation (JSON) contents, the control handler application in the embedded web server 701 extracts intact the HTTP Request Body and delivers it to the RC plug-in 702, in step 714. In step 715, by generating an on ReceivingMsg event, the RC plug-in 702 inserts the contents of the HTTP Request Body in a parameter of the event, and delivers it to the application 703. The application 703 can process the control information provided from the third device 700 through a function for processing a parameter in the event.

The commands are handled at the web application 703 with the RUIS 705, in step 717.

In another method for processing Body contents of an HTTP Request, if the contents (e.g., extracted based on a keyword) for controlling the RUIC 704 are contained in the Body of the HTTP Request provided from the third device 700, the control handler application in the embedded web server 701 controls the RUIC 704 by extracting the contents. If contents to be delivered to the application 703 are contained, the control handler application extracts only the related part and delivers control information to the application 703 in the manner described above.

In short, if control information transmitted from the third device 700 is predefined control information, the control information is directly transmitted from the embedded web server 701 to a browser in the RUIC 704 and the transmitted control information is transmitted to the application 703 running in the browser in the RUIC 704 on an event basis, in step 713. The event refers to predefined events such as on KeyDown, on KeyPress, and on KeyUp. However, if the control information is not predefined control information, the control information is transmitted from the embedded web server 701 to the RC plug-in 702 in step 714, and the RC plug-in 702 commands the browser in the RUIC 704 to generate an event and deliver undefined control information to the application 703 in step 715. For example, the event may be delivered in the name of on ReceivingMsg, and a Device Handle value for the connected third device 700 and control information may be delivered as a parameter. Regarding the control information, Header and/or Body information of the HTTP message may be delivered through the event parameter.

FIG. 8 illustrates delivery of predefined control information between a third device and an RUIC through an HTTP, according to an embodiment of the present invention.

Referring to FIG. 8, if a user presses a PLAY button for video on a third device 800, PLAY information predefined between the third device 800 and an RUIC 801 may be delivered from the third device 800 to the RUIC 801 through an HTTP message 802. In FIG. 8, in order to receive notification of the transmission of the predefined PLAY information, the RUIC 801 uses keychar as a 'key' value, and the keychar is transmitted to the RUIC 801 after being matched with its associated information (e.g., VK_PLAY). Upon receiving control information, the RUIC 801 delivers the control information to a remote UI on an event basis. The RUIC 801 may use predefined events such as on KeyDown, on KeyUp and on KeyPress. In addition, when sending an HTTP message to the RUIC 801, the third device 800 may instruct to deliver control information to the application 703 using a specific event among the predefined events, by inserting the control information into a URL parameter or the Body of the HTTP message.

FIG. 9 illustrates delivery of undefined control information (e.g., a series of letters and numbers in an undefined message format) between a third device and an RUIC through an HTTP, according to an embodiment of the present invention.

Generally, predefined information, such as characters or numbers, should be transmitted one by one. However, as shown in FIG. 9, if the third device 800 uses an HTTP message 900 in transmitting control information to the RUIC 801, it is possible to deliver several letters or numbers at the same time. By writing a multi-character/number message (e.g., 'Hello') he or she desires to deliver through a control UI represented in the third device 800, and then pressing a SEND button, the user may send the message through the HTTP message 900 in a collective manner. A 'key' value may be 'msg', and message information that the user desires to send may be inserted into a value corresponding to the 'key' value.

FIG. 10 illustrates delivery of undefined control information (capable of directly executing a function executed in an RUIC) between a third device and an RUIC through an HTTP, according to an embodiment of the present invention. A user sends an HTTP message 1000 to the RUIC 801 from the third device 800. If the user clicks a specific button on a control UI in the third device 800, a function existing in an RUI running in the RUIC 801 is invoked. When the HTTP message is sent, a 'key' value may be 'function', and a 'value' corresponding to the 'key' value may be startMovieAndExecuteChatting, which is capable of starting a movie and executing chatting.

FIG. 11 illustrates an HTTP representing a method for sending undefined messages between a third device and an RUIC, according to an embodiment of the present invention.

In FIG. 11, the third device 800 may define a form action 1100 for an HTTP message, insert a desired message 1101 into an HTTP BODY in the form of XML, JSON, or Plain Text, and send it to the RUIC 801. For example, as shown in FIG. 12, the third device 800 may represent the function described in FIG. 10 in the form of XML, insert it into an HTTP BODY, and send it to the RUIC 801.

FIG. 13 shows an API, according to an embodiment of the present invention.

If an undefined command (e.g., XML, JSON, URI, or Plain Text) is transmitted from the third device to an OITF terminal, a remote control plug-in in the OITF terminal sends an associated command to a DAE entity on an event basis. A first parameter of an on ReceivingMsg event function is a Device Handle value for the third device that sent the command, and through the parameter value, a return value for the third device that sent the command, or an additional message may be transmitted. A second parameter thereof is a message value transmitted from the third device to the DAE entity.

FIG. 14 shows an interface and transmission step for transmitting a predefined or undefined command or message to an OITF terminal, or an RUIC, by the third device using a predefined key code value, according to an embodiment of the present invention.

As shown in FIG. 14, the transmission step roughly includes three steps. In a first step, an HTTP message is sent to the OITF terminal by a control UI running in the third device. The HTTP message may be sent in different ways for one case where a predefined key code value is sent and another case where an undefined command or message is sent.

In the former case, where a predefined key code value is sent, as defined in HTTP Request Header of Step 1-1, URI (rcf/send_keycode) and a parameter key value are predefined and sent to the OITF terminal using a GET or POST method. Even in the latter case, where an undefined command or message is sent, as shown in Step 1-2, a command or message may be inserted into an HTTP Body and sent through a predefined URI (/rcf/send_message) using the POST method. In this manner, for the two cases, it is possible to define an independent protocol by dividing a URI, or it is possible to integrate two different URIs into one URI and additionally use a parameter value indicating whether a command is a predefined one or an undefined one.

In a second step, the control UI waits until it receives a response, after sending the HTTP message in the first step.

In a third step, if the command sending is successful, the OITF terminal sends a 200 OK HTTP message to the third device. A proper message that the OITF terminal sends to the third device may be inserted into a Body of the HTTP message, or the Body of the HTTP message may be empty.

Figure 15:
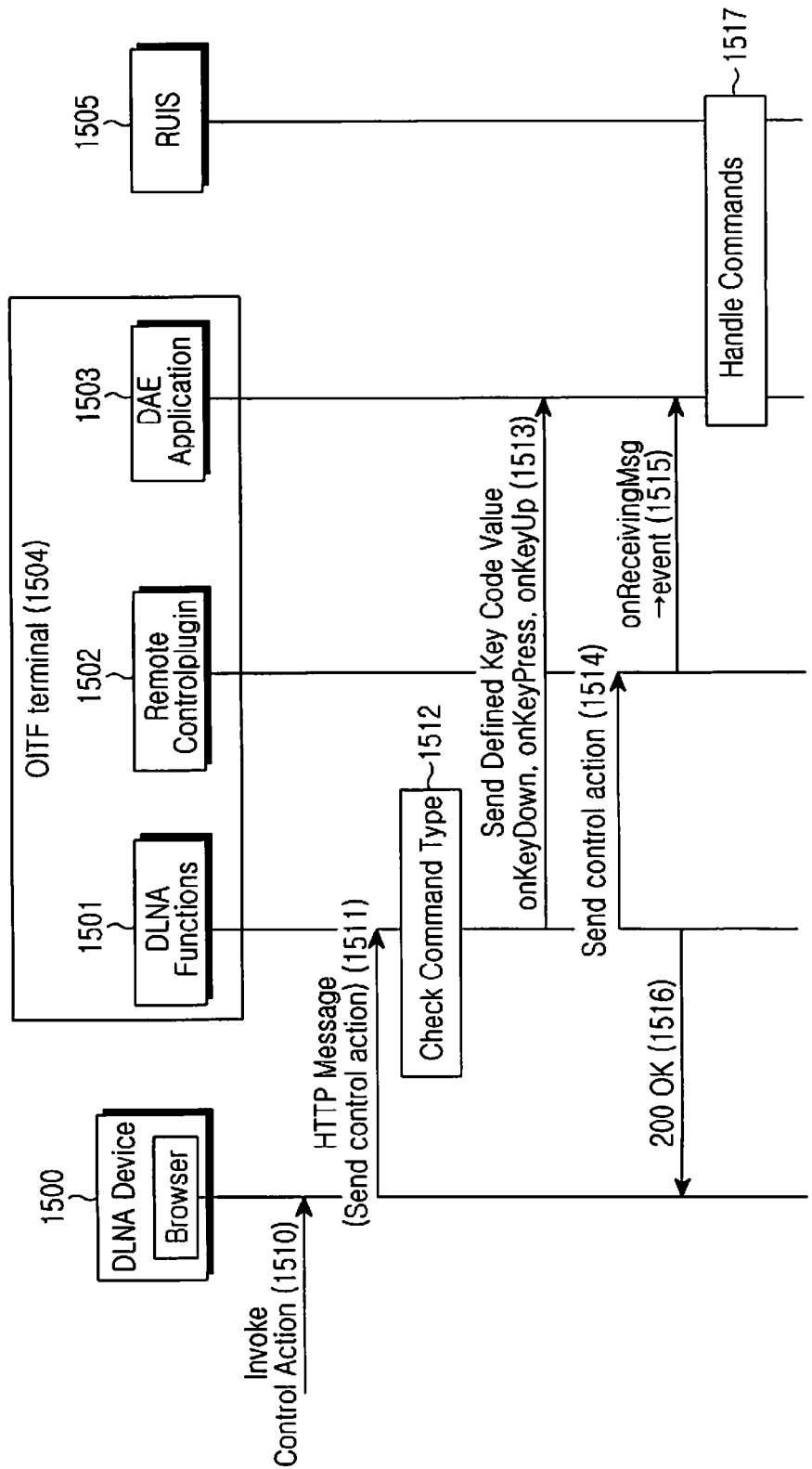
FIG. 15 is a diagram illustrating the sending of predefined control information and undefined control information, according to an embodiment of the present invention.

FIG. 15 is a diagram illustrating the sending of predefined control information and undefined control information, according to an embodiment of the present invention.

As shown in FIG. 15, if a user invokes a control command (or control action) to DLNA Functions 1501 of an OITF terminal 1504 through a control UI running in a DLNA Device 1500, in steps 1510 and 1511, the DLNA Functions 1501 checks a command type, in step 1512. If the command is a predefined key code value, the DLNA Functions 1501 commands a DAE browser to deliver the key code value to a DAE application 1503 through an event (e.g., on KeyDown, on KeyPress, on KeyUp, etc.), in step 1513. However, if the command is not a predefined key code value, the DLNA Functions 1501 sends its associated command or message to a remote control plug-in 1502, in step 1514. In step 1515, the remote control plug-in 1502 generates an on ReceivingMsg event function, and sends a command or message to the DAE application 1503, allowing the DAE application 1503 to process the command with an RUIS 1505, in step 1517.

As is apparent from the foregoing description, according to embodiments of the present invention, a control UI associated with an RUI being rendered in a third device can arbitrarily create control information without the need to consider control information predefined between devices, thereby easily delivering undefined control information to the RUI. By doing so, it is not necessary to realize an extended control function with limited control information, making it possible to provide a more improved user experience.

While the invention has been shown and described with reference to certain embodiments thereof, it will be understood by those skilled in the art that various changes in form and detail may be made therein without departing from the spirit and scope of the invention as defined by the appended claims and their equivalents.

The invention claimed is:

1. A method for controlling a Remote User Interface Client (RUIC), on which a remote user interface is displayed, through another RUIC, comprising the steps of:
   receiving, at the RUIC from the other RUIC, a message including control information that indicates a control action corresponding to a user input at the other RUIC;
   determining, by the RUIC, whether the control information is predefined information or undefined information;
   when the control information is predefined information, delivering the control information from a web server of the RUIC to an application of the RUIC, and executing a control operation corresponding to the control information by the application; and
   when the control information is undefined information, delivering the received control information from the web server to the application through a remote control plug-in in the RUIC to execute the control operation corresponding to the control information by the application.

2. The method of claim 1, wherein executing the control operation comprises:
when the control information is predefined information, extracting a value of a parameter key corresponding to the control action at the web server, generating a predefined event, and delivering the predefined event to the application with the extracted value.

3. The method of claim 1, wherein executing the control operation comprises:
when the control information is undefined information, extracting a value of a parameter key corresponding to the control action at the web server, delivering the extracted value to the remote control plug-in, generating a specific event by the remote control plug-in, and delivering the specific event to the application with the extracted value.

4. The method of claim 1, further comprising:
when the message is a HyperText Transfer Protocol (HTTP) request message and a text corresponding to the control information is included in a body of the message, extracting the body of the message by the web server, delivering the extracted body to the remote control plug-in, generating a specific event by the remote control plug-in, delivering the specific event with contents of the body to the application, and executing the control operation corresponding to the control information by the application.

5. The method of claim 4, wherein the HTTP request message comprises a parameter indicating whether the control information is predefined information.

6. The method of claim 4, wherein the application executes the control operation corresponding to the control information through a function for processing a parameter in the specific event.

7. The method of claim 1, wherein the predefined information comprises a key code.

8. The method of claim 1, wherein the undefined information comprises a text.

9. A Remote User Interface Client (RUIC), on which a remote user interface is displayed, controlled by a user on another RUIC, the RUIC comprising:

a web server for receiving, from the other RUIC, a message including control information that indicates a control action corresponding to a user input at the other RUIC, determining whether the control information is predefined information or undefined information, and transmitting the control information based on the determination;
an application for receiving the control information from the web server when the control information is predefined information, and for executing a control operation corresponding to the control information; and
a remote control plug-in for, when the control information is undefined information, receiving the control information from the web server, generating a specific event corresponding to the control information, and transmitting the control information to the application.

10. The RUIC of claim 9, wherein, when the control information is predefined information, the web server extracts a value of a parameter key corresponding to the control information, generates a predefined event, and delivers the specific event to the application with the extracted value.

11. The RUIC of claim 9, wherein, when the control information is undefined information, the web server extracts a value of a parameter key corresponding to the control information, and delivers the extracted value to the remote control plug-in.

12. The RUIC of claim 9, wherein, when the message is a Hypertext Transfer Protocol (HTTP) request message and a text corresponding to the control information is included in a body of the message, the web server extracts the body of the message and delivers the extracted body to the remote control plug-in.

13. The RUIC of claim 12, wherein the HTTP request message comprises a parameter indicating whether the control information is predefined information.

14. The RUIC of claim 12, wherein the application executes the control operation corresponding to the control information through a function for processing a parameter in the specific event.

15. The RUIC of claim 9, wherein the predefined information comprises a key code.

16. The RUIC of claim 9, wherein the undefined information comprises a text.

* * * * *